United States Patent [19]

Jacobson

[11] Patent Number: 5,730,017
[45] Date of Patent: Mar. 24, 1998

[54] CUTTER HOLDER

[75] Inventor: John D. Jacobson, Southington, Conn.

[73] Assignee: Newcomb Spring Corporation, Southington, Conn.

[21] Appl. No.: 508,871

[22] Filed: Jul. 28, 1995

[51] Int. Cl.$^6$ .............. B21F 3/02; B21D 37/01; B21D 37/04

[52] U.S. Cl. .............. 72/140; 72/481.1; 72/462; 407/83

[58] Field of Search .............. 72/129, 140, 334, 72/337, 481, 462; 83/699.51, 699.61, 698.11, 856; 407/79, 83, 89, 81

[56] References Cited

U.S. PATENT DOCUMENTS

| | | | |
|---|---|---|---|
| 1,088,569 | 2/1914 | Hane | 407/83 |
| 1,120,783 | 12/1914 | Amborn | 407/83 |
| 1,413,490 | 3/1922 | Pretsch | 407/89 |
| 1,606,718 | 11/1926 | Orup | 407/83 |
| 2,119,002 | 5/1938 | Bergevin et al. | 72/145 |
| 2,304,771 | 12/1942 | Davis | 83/699.61 |
| 5,131,251 | 7/1992 | Jacobson | 72/140 |
| 5,201,208 | 4/1993 | Jacobson | 72/140 |

*Primary Examiner*—Lowell A. Larson
*Assistant Examiner*—Rodney A. Butler
*Attorney, Agent, or Firm*—Alix, Yale & Ristas, LLP

[57] ABSTRACT

A cutter unit for mounting to a slide on a spring coiling machine, comprising a holder having an arm portion, extending along a first direction, for mounting to the coiling machine and a head portion extending along a second direction perpendicular to the first direction and defining an adjustable bore having an axis which extends in a third direction perpendicular to the first and second directions. A plug is insertable coaxially within the adjustable bore and sized to provide axial and rotational degrees of freedom within the bore. The plug includes a front face having a slot oriented transversely to the axis of the bore and sized to receive a cutting tool, and screws or the like for fixing the tool in the slot. A bolt or the like is carried by the head portion, for adjusting the bore to selectively permit axial and rotational movement of the insert therein, and to prevent said movement.

10 Claims, 3 Drawing Sheets

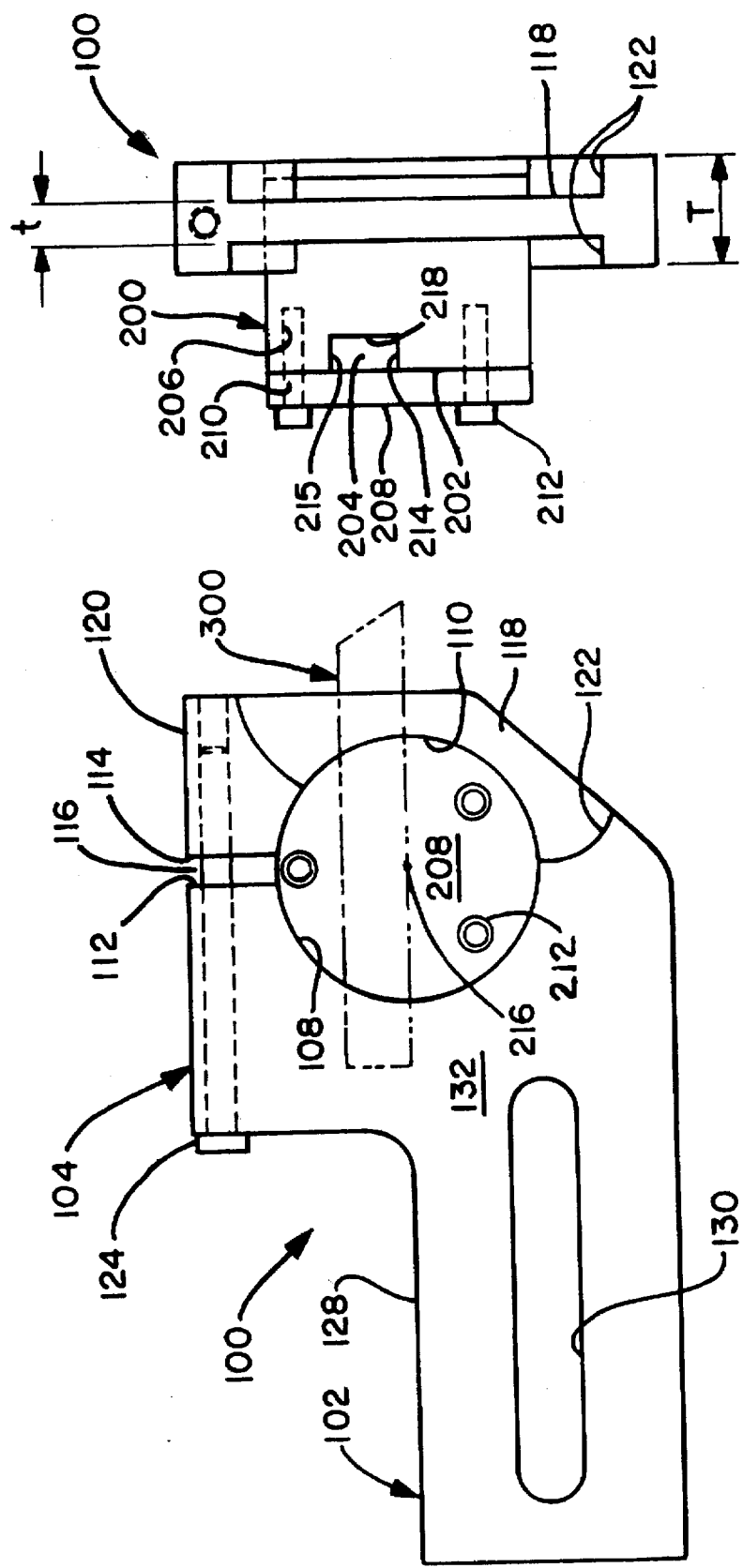

CUTTER HOLDER

BACKGROUND OF THE INVENTION

The present invention relates to spring coiling machines, and in particular, to apparatus for holding a cutting tool, by which wire fed to the machine can, after coiling, be severed, thereby forming a distinct spring.

The automatic fabrication of springs from a roll of wire, has been practiced for many years, as evidenced by U.S. Pat. No. 2,119,002 issued May 31, 1938 for "Spring Coiling Machine". Some of the basic operating techniques are also disclosed, for example, in U.S. Pat. No. 5,131,251 issued Jul. 21, 1992 for "Chuck Set Up For Spring Coiling Machine", and U.S. Pat. No. 5,201,208 issued Apr. 13, 1993 for "Coiling Point Holder For Spring Coiling Machine", the disclosures of which are hereby incorporated by reference.

FIGS. 1 and 2 illustrate some of such known techniques. The spring coiling machine 10 may be any of numerous makes and models which are employed for manufacturing coil springs in an automatic, highly efficient process. For ease of consistent reference to directionality, FIGS. 1 and 2 include the orthogonal axes indicated with the positive and mutually perpendicular X, Y and Z axes.

The spring coiling machine 10 employs a multiplicity of gears, linkages, levers, cams and power supplies, all of which are operatively integrated for the purposes of feeding, bending, and cutting a wire W at a coiling station 20. Most of these mechanisms are situated behind the front panel 30. The wire W is plastically deformed at the coiling station into a coil spring S having desired characteristics such as diameter, length and pitch which may vary for a given coil. The coil spring S is then severed from the supply wire. The manufacturing sequence is continuously replicated so that multiple coil springs are produced without any interruption in a highly efficient manufacturing process.

The coiling station 20 operates on the workpiece in the form of a continuous wire to produce the coil spring S. The supply of wire W is displaced by feed rolls 24 through a wire guide 26 and a block wire guide 28. The wire is continuously displaced generally parallel to the front face of panel 30 of the machine until it reaches the arbor 32. The front panel 30 of the machine extends outwardly from the plane of FIG. 2. The arbor 32 and the block wire guide 28 are mounted to a tool holder or chuck 40 which is mounted through the front panel 30 and clamped into position. A coiling point 34 contacts the wire as it emerges from between the arbor 32 and the block guide 28 and deform ably forces the wire into a generally helical shape. A pitch tool 36 is conventionally wedged at an angle to the wire thereby establishing the pitch of a plurality of successive loops or turns in the coil. When the spring reaches the desired number of turns, a cutting tool 50, for example in the form of a tension assembly having a projecting cutting blade 52, is actuated. The blade 52 is pivotally displaced from the upper left in the direction indicated as a counterclockwise arrow in FIG. 1, to sever the feed wire against the arbor 32 and thereby complete the fabrication of the coil spring S.

In conventional spring coiling machines, it is common to have a plurality of wire rolls 54, 54', 54" each having a wire with a different diameter, shape and/or composition so that for a given work order, a specific supply of wire can be selected and supplied to the coiling station 20. The feed paths from the wire rolls typically extend through generally parallel wire guide channels 60, 60', 60" which are spaced in the Z direction from the front panel 30 of the machine adjacent the coiling station. The wire selected for a given work order, is then fed from the specific wire guide 60, 60', 60" to the block wire guide 28 for deformation to produce the coil spring. Because the feed locations of the various wire guides and paths have different input positions to the coiling station 20 according to the selected wire, it is necessary to specifically axially align the block wire guide 28 with the wire guide for the given selected wire supply. For example, as illustrated in FIG. 2, the block wire guide 28 can be repositioned in the Z direction to align the block wire guide 28 with guide channel 60' or 60". The cutter 50, pitch tool 36, and coiling point 34 must also be adjustable.

An important component of the total cost of manufacture for an order of a particular type of spring, is the combination of machine down time and operator labor, associated with making such adjustments in setting up the machine to perform the particular operations by which the desired spring is fabricated, and maintaining the effectiveness of these operations, e.g., by the periodic sharpening or replacement of worn tools.

SUMMARY OF THE INVENTION

It is an object of the present invention to provide an improved cut tool holder, by which the cut tool can be initially set up and replaced more easily and quickly than in known spring making machines.

One aspect of the invention is directed to a cutter unit for mounting to a slide on a spring coiling machine, comprising a holder having an arm portion, extending along a first direction, for mounting to the coiling machine and a head portion extending along a second direction perpendicular to the first direction and defining an adjustable bore having an axis which extends in a third direction perpendicular to the first and second directions. A plug is insertable coaxially within the adjustable bore and sized to provide axial and rotational degrees of freedom within the bore. The plug includes a front face having a slot oriented transversely to the axis of the bore and sized to receive a cutting tool, and screws or the like for fixing the tool in the slot. A bolt or the like is carried by the head portion, for adjusting the bore to selectively permit axial and rotational movement of the insert therein, and to prevent said movement.

In another aspect of the invention, the head portion includes a gap which intersects the bore. The bolt or other means for adjusting the bore, selectively changes the cross section of the bore by changing the gap. The bore is defined in part by a web of reduced thickness at a location diametrically opposed to the intersection of the gap with the bore. The web portion preferably defines substantially one semi-cylindrical portion of the bore.

In another aspect of the invention, the web portion includes an enlarged lobe having a shoulder defining a portion of the gap, and the means for adjusting the plug bore includes a threaded bore in the enlarged lobe. The means for adjusting also includes a bolt extending across the gap into the threaded bore of the lobe.

BRIEF DESCRIPTION OF THE DRAWINGS

The present specification is accompanied by drawings, wherein like numerals refer to like structure, in which:

FIG. 4 is another view of the cut tool holder, taken from the left of FIG. 3;

FIG. 5 is an end view of the cut holder, taken from the right of FIG. 4.

DESCRIPTION OF THE PREFERRED EMBODIMENT

Figure 1:
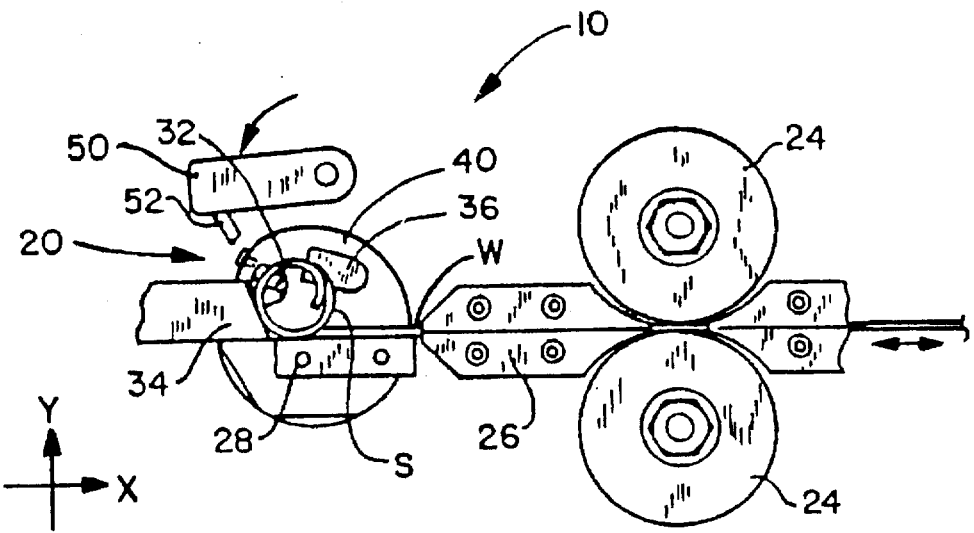
FIG. 1 shows the main operational components on the front face of a typical spring coiling machine.

The present invention can be implemented as a replacement for the tension actuated, pivotable cut tool holder 50 shown in FIG. 1. Alternatively, the cut tool could be mounted to pivot around a point below the chuck 40, or the movement of the cut tool holder could be linear or follow some other path. The essential aspect of the present invention is the way in which the cut tool itself 52 is mountable within the cut tool holder 50. The cut tool holder 50 can, therefore, be mounted at the option of the operator and the available slide bearing or cam actuated pick up points, in any convenient manner.

Figure 3:
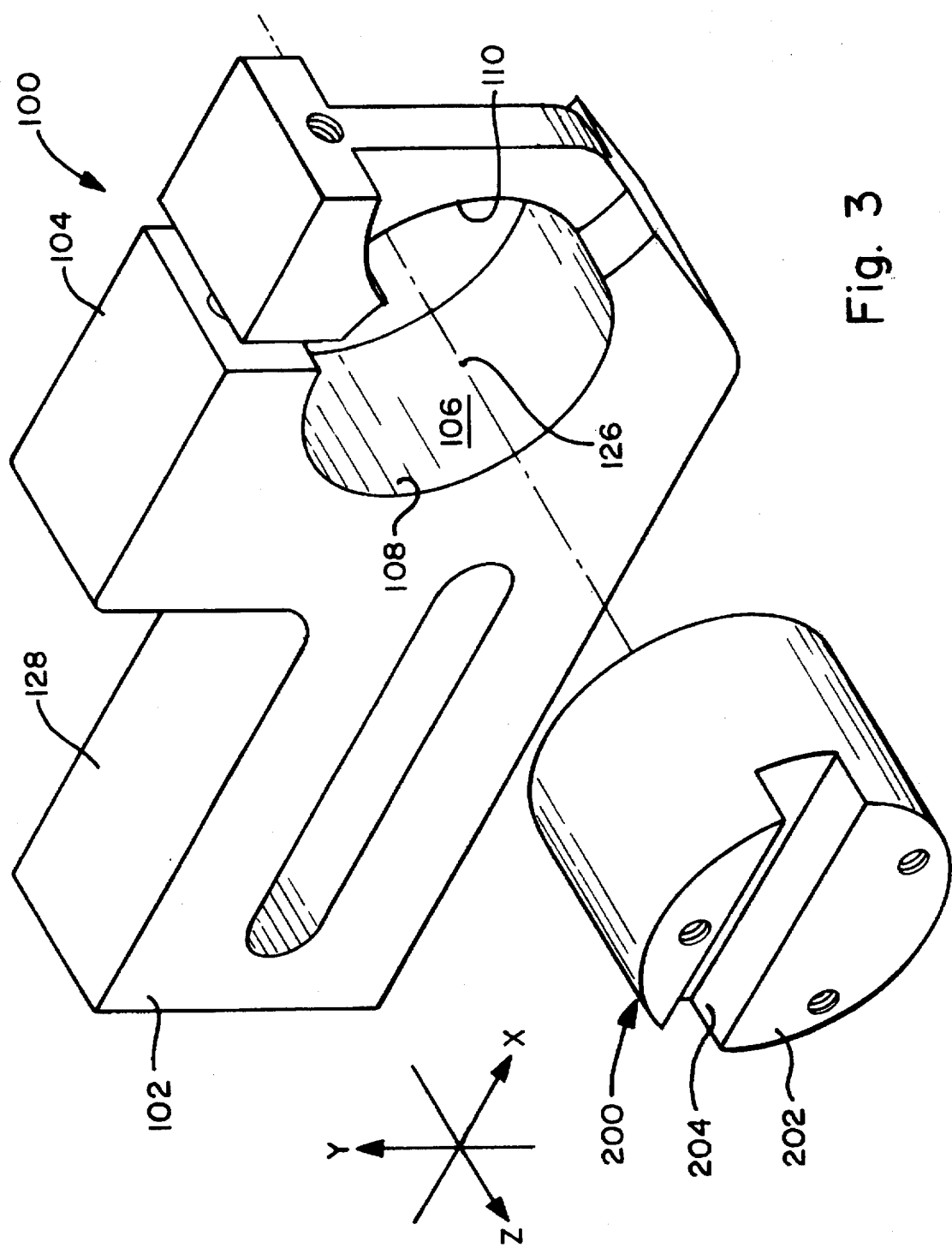
FIG. 3 is a perspective view of a cut tool holder in accordance with the present invention.

The cut tool holder 100 as shown in FIGS. 3–5, is particularly suited for attachment to a linear slide so as to move, e.g., at an angle of 45° to the chuck. The holder, preferably has an elongated slide arm portion 102 and a head portion 104. The head portion 104 defines an adjustable bore 106, having opposed substantially semi-circular profiles, 108,110. For convenience, the coordinate system shown in FIG. 3 provides a frame of reference for terminology in which "first direction" means along the "X" axis; "second direction" means along the "Y" axis, and "third direction" means along the "Z" axis. With this frame of reference, the slide arm is elongated in the first direction, and the head portion is integral with the slide arm and elongated in the second direction. Opposed, first and second shoulders 112, 114 are situated approximately at the top of the bore, thereby defining a gap 116 which intersects the bore 106. At approximately the bottom of the bore, the head includes a web of reduced thickness which generally defines semi-circular profile 110. The upper portion of the web 118 preferably is in the form of an enlarged lobe 120 or the like which defines the second shoulder 114 near the top of the bore. Coaxial threaded bores pass through the shoulders 112,114, such that upon tightening of a bolt 124 passing therethrough, the size of the gap 116 and therefore effective diameter of bore 106, can be reduced.

Preferably, the thickness T of the slide arm and head, i.e., in the third direction, is substantially uniform except, as shown in FIG. 5, the web portion 118, particularly at the juncture 122 with the head portion at the bottom of the bore, is of reduced thickness t. This reduced thickness of the web at the juncture 122, is sufficient to maintain the rigidity of the web under manual handling, but provides enough elasticity such that the manual tightening of the bolt 124 passing between the head and the lobe of the web, can reduce the gap 116.

In essence, the arrangement shown in FIG. 3 provides for a smooth through bore 106 having sufficient rigidity to receive a cylindrical plug or insert 200 with relatively close tolerance, but sufficient elasticity to permit the manual reduction of the effective diameter of the through bore, so as to tighten down on and retain the plug 200 situated in the bore.

The cylindrical plug 200, has a length along the third direction, which is preferably greater than the thickness T of the head in the third direction, such that upon insertion of the plug 200 fully into the bore 106, a substantial portion, preferably at least about half, of the length of the plug will project from the head, in the third direction, i.e., positive Z direction. The face 202 of the cylindrical plug, which lies in the X,Y plane, has a channel 204 formed therein, with a cross sectional shape adapted to mate with the cross sectional shape of a cutting tool 300 (in phantom). The face of the insert also has a plurality of threaded bores 206, with at least one on each of the opposite sides of the channel. Preferably, the channel does not pass diametrically through the face of the plug, but rather is analogous to the chord of a circle. The insert has a smooth outer surface which can be inserted within the bore of the holder, in any angular orientation, and at any axial position, i.e., along the Z direction. A substantially circular cap 208 having a pattern of bores 210 corresponding to the pattern of threaded bores on the face of the plug, can be drawn towards the face of the plug by a corresponding plurality of bolts 212, thereby securing the cut tool tightly in the channel.

Preferably, the center 126 of the bore 106 in the cut tool holder, is approximately on a line extending in the first direction, along the top surface 128 of the slide arm portion of the holder. As a further preference, one of the sidewalls 214,215 of the channel, passes through the centerline 216 of the plug and therefore also passes through the centerline 126 of the bore 106.

The elongated slide arm preferably includes a slide slot 130, which is elongated in the first direction. This slot provides for the adjustability of the mounting of the cut tool holder along the X,Y plane, i.e., along the imaginary plane defined by the front panel of the spring machine. The positional adjustment of the tool perpendicularly to the front panel, i.e., along the Z direction, can be readily accomplished by adjustment of the plug insert in bore. The length of the insert in the Z direction, should, of course, be sufficient to provide a good holding force on the insert over a range of axial positions from the axial position wherein the base 218 of the channel is substantially in alignment with the face 132 of the head portion of the cut tool holder, to the axial position corresponding to the maximum expected offset of the base of the channel relative to the face of the head.

Thus, in operation on the spring coiling machine, the cut tool holder is preferably mounted to, e.g., a slide that moves along the X,Y plane. The tool 300 is offset to maintain a 5° relief when cutting. Upon actuation, the tool slides past the arbor, along a corner where the wire passes over the arbor, such that the wire is cut against the corner of the arbor. As the cutting tool wears, it must be sharpened, bringing to the forefront, an important advantage of the present invention. The tool can be sharpened, without demounting the cut tool holder from the slide or other structure to which it has been attached on the front face of the machine. The operator loosens the bolt 124, thereby restoring the gap 116 to its original dimension, such that the operator can readily pull the insert 200 out along the Z direction, while the cutting tool 300 is still secured in the channel 204. The operator can then quickly loosen the bolts 212 on the cap 208, without necessarily removing the cap, slide the cut tool 300 out of the channel, sharpen the tool, insert it back into the channel, and tighten the cap. The plug with secured tool, is then replaced into the bore 106 and the bolt 124 on the head tightened before operation of the machine is resumed.

Preferably, the initial step in the set up is to move the cutter unit manually to the cut position, i.e., such that the tool is at the corner of the cutting arbor. The plug is then removed from the cut tool holder and the sharpening and replacement steps are performed. Upon reinsertion of the plug, it is rotated such that the cutting tool again rests on the corner of the cutting arbor, whereupon the bolt is tightened.

The cut tool holder is then manually returned to the initial position, before resuming the automatic operation of the machine.

Figure 2:
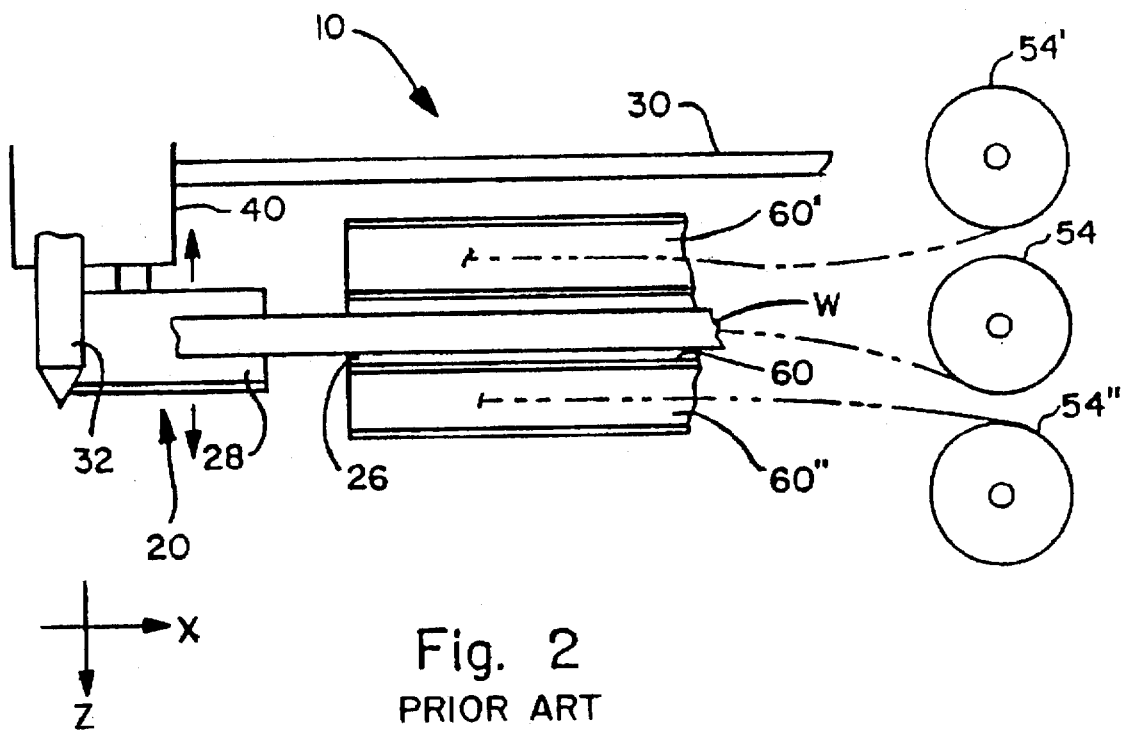
FIG. 2 shows a plan view of the components at the front face of the machine, corresponding to FIG. 1.

As indicated in FIG. 2, on some machines, multiple wire lines are available and the position of a particular wire such as W, can vary in the Z direction. The operator can readily adjust the position of the plug, and thereby the cutting tool tip, in the Z direction, to take into account the particular one of a plurality of possible wire lines that is in use.

It should be appreciated that the present invention is not to be limited by the particular structural implementation described in the present specification and accompanying drawings. For example, the relative size and shapes of the slide arm, head, and web portions of the holder, may vary according to the particular machine with which it will be utilized. In the illustrated embodiment, the holder was formed from a single, substantially rectangular steel block such that the web is integral with the head, but other implementations may also be possible without departing from the spirit and scope of the invention.

I claim:

1. A cutter unit for mounting to an actuator on a spring coiling machine, comprising:

a holder having an arm portion, for mounting to the actuator and a head portion defining an adjustable bore having an axis;

an insert member coaxially receivable within said adjustable bore and sized to provide axial and rotational degrees of freedom within said adjustable bore, said insert member including a front face having a slot oriented transversely to the axis of the bore and sized to receive a cutting tool, and means for fixing the tool in said slot; and means carried by the head portion, for adjusting the bore to selectively permit axial and rotational movement of the insert therein, and to prevent said movement.

2. The cutter unit of claim 1, wherein the head includes a gap which intersects said bore and said means for adjusting the bore selectively changes the cross section area of the bore by changing the gap, thereby permitting independent axial and rotational movement of the insert.

3. A cutter unit for mounting to a slide movable in a first direction along the front panel of a spring coiling machine, toward and away from a chuck at which a formed spring is to be cut, comprising:

a holder having an arm portion, extending along said first direction when mounted to the slide of the coiling machine, and a head portion extending along a second direction perpendicular to the first direction and defining an adjustable bore having an axis which extends in a third direction perpendicular to the first and second directions;

an insert member coaxially receivable within said adjustable bore and sized to provide axial and rotational degrees of freedom within said adjustable bore, said insert member including a front face having a slot oriented transversely to the axis of the bore and sized to receive a cutting tool, and means for fixing the tool in said slot; and means carried by the head portion, for adjusting the bore to selectively permit axial and rotational movement of the insert therein, and to prevent said movement.

4. The cutter unit of claim 3, wherein the arm portion includes a slot extending in said first direction, for adjustably mounting the holder to the slide of the coiling machine.

5. The cutter unit of claim 3, wherein the head includes a gap which intersects said bore and said means for adjusting the bore selectively changes the cross section of the bore by changing the gap.

6. The cutter unit of claim 4, wherein the head includes a gap which intersects said bore and said means for adjusting the bore selectively changes the cross section of the bore by changing the gap.

7. The cutter unit of claim 5, wherein the bore is defined in part by a web of reduced thickness at a location diametrically opposed to the intersection of the gap with said bore.

8. The cutter unit of claim 7, wherein the web portion defines substantially one semi-cylindrical portion of the bore.

9. The cutter unit of claim 8, wherein the web portion includes an enlarged lobe having a shoulder defining a portion of said gap, and said means for adjusting includes a threaded bore in said enlarged lobe.

10. The cutter unit of claim 9, wherein the means for adjusting includes a bolt extending in said first direction across said gap into said threaded bore of the lobe.

* * * * *